(12) United States Patent
Peter et al.

(10) Patent No.: US 6,942,708 B2
(45) Date of Patent: Sep. 13, 2005

(54) BIFILAR DIESEL EXHAUST FILTER CONSTRUCTION USING SINTERED METAL FIBERS

(75) Inventors: Klaus J. Peter, Natick, MA (US); Osama Ibrahim, Westborough, MA (US); Peter Willey, East Providence, RI (US); Zachary Nardi, Cumberland, RI (US); Amin Saeid, Milford, MA (US)

(73) Assignee: Rypos, Inc., Medway, MA (US)

(*) Notice: Subject to any disclaimer, the term of this patent is extended or adjusted under 35 U.S.C. 154(b) by 67 days.

(21) Appl. No.: 10/249,526

(22) Filed: Apr. 16, 2003

(65) Prior Publication Data

US 2003/0196419 A1 Oct. 23, 2003

Related U.S. Application Data

(60) Provisional application No. 60/417,723, filed on Oct. 10, 2002, and provisional application No. 60/373,472, filed on Apr. 18, 2002.

(51) Int. Cl.[7] .................................................. B01D 46/00
(52) U.S. Cl. .................... 55/282.3; 55/282.2; 55/385.3; 55/482; 55/484; 55/487; 55/498; 55/500; 55/521; 55/523; 55/524; 55/DIG. 10; 55/DIG. 30; 60/311
(58) Field of Search .............................. 55/282.2, 282.3, 55/385.3, 482, 484, 485, 486, 487, 489, 498, 500, 521, 523, 524, DIG. 10, DIG. 30; 60/297, 303, 311

(56) References Cited

U.S. PATENT DOCUMENTS

| | | | |
|---|---|---|---|
| 4,829,766 A | 5/1989 | Henkel | 60/303 |
| 5,258,164 A | 11/1993 | Bloom et al. | 422/174 |
| 5,405,422 A * | 4/1995 | Ueda et al. | 55/282.3 |
| 5,446,264 A | 8/1995 | Kondo et al. | 219/552 |
| 5,453,116 A | 9/1995 | Fischer et al. | 95/278 |
| 5,457,945 A * | 10/1995 | Adiletta | 55/DIG. 10 |
| 5,458,664 A | 10/1995 | Ishii et al. | 55/282 |

(Continued)

FOREIGN PATENT DOCUMENTS

| | | |
|---|---|---|
| JP | 05231133 A | 9/1993 |
| JP | 06002526 A | 1/1994 |

*Primary Examiner*—Duane Smith
*Assistant Examiner*—Jason M. Greene
(74) *Attorney, Agent, or Firm*—Barlow, Josephs & Holmes, Ltd.

(57) ABSTRACT

A diesel particulate filter construction, for filtering particulate from a flow of exhaust, includes a first layer of electrically resistive metal filter material in line with the flow of exhaust with particulate therein and a second layer of electrically resistive filter material which is also in line with the flow of exhaust with particulate therein. The layers are pleated cylinders concentrically positioned relative to one another. Current from a power supply is routed through the first layer and the second layer, which are electrically connected in series to one another. The layers are positioned so that exhaust flows through both the layers. Sufficient heat is generated by the flow of current through the layers to generate heat to, in turn, burn off entrapped particulate. The layers may be made of made of different materials of different fiber sizes or coated with different catalysts to generate different amounts of heat from one another to improve the filtration characteristics of the particulate filter construction.

18 Claims, 7 Drawing Sheets

U.S. PATENT DOCUMENTS

| | | | |
|---|---|---|---|
| 5,480,621 A | 1/1996 | Breuer et al. | 422/174 |
| 5,505,911 A | 4/1996 | Hafele | 422/174 |
| 5,620,490 A * | 4/1997 | Kawamura | 55/282.3 |
| 5,628,928 A | 5/1997 | Rolf | 219/488 |
| 5,682,740 A * | 11/1997 | Kawamura | 55/523 |
| 6,056,796 A | 5/2000 | Chiang et al. | 55/302 |
| 6,063,150 A * | 5/2000 | Peter et al. | 55/282.3 |
| 6,090,172 A * | 7/2000 | Dementhon et al. | 55/282.3 |
| 6,102,976 A | 8/2000 | Oji et al. | 55/282.3 |
| 6,120,583 A * | 9/2000 | Saito et al. | 55/282.3 |
| 6,152,978 A * | 11/2000 | Lundquist | 55/523 |
| 6,340,379 B1 * | 1/2002 | Penth et al. | 55/523 |
| 6,471,918 B1 | 10/2002 | Sherwood | 422/171 |
| 6,572,682 B2 * | 6/2003 | Peter et al. | 55/282.3 |
| 6,585,788 B2 * | 7/2003 | Sugano | 55/282.3 |
| 2002/0046555 A1 | 4/2002 | Sherwood, Jr. | 55/482 |
| 2002/0094312 A1 | 7/2002 | Hanus et al. | 422/199 |
| 2002/0162310 A1 | 11/2002 | Miller et al. | 55/523 |
| 2002/0174770 A1 | 11/2002 | Badeau et al. | 95/273 |

* cited by examiner

BIFILAR DIESEL EXHAUST FILTER CONSTRUCTION USING SINTERED METAL FIBERS

CROSS REFERENCE TO RELATED APPLICATIONS

This application claims the benefit of U.S. Provisional Patent Application Ser. No. 60/417,723, filed Oct. 10, 2002 and U.S. Provisional Patent Application Ser. No. 60/373,472, filed Apr. 18, 2002.

BACKGROUND OF INVENTION

The present invention relates generally to acapsBM-capsBMn electrically regenerable filter assembly. More specifically, the present invention relates to the regenerable self-cleaning filter construction that can be employed in a filter system for removing carbon, lube oil and unburned fuel particulates from the exhaust of internal combustion engines. In addition, the present invention relates to a regenerable filter construction for removing particulates from Diesel engine exhaust gases.

In the automotive industry, there has been a tremendous concern over the introduction of harmful pollutants into the air which have been generated by vehicle exhaust. Due to the negative health effects of such emissions, the Environmental Protection Agency of the United States has expressed a desire to reduce particle emissions from internal combustion engines. In the United States, the majority of particulate emissions come from Diesel engines on trucks and buses, which have not been regulated as closely as vehicles with gasoline engines.

Various attempts have been made to decrease the particulate emissions from Diesel engines. Unlike with gasoline engine vehicles, existing catalytic converters do not work well with Diesel engines since particulates typically clog these devices since the temperatures within them are too low to effectively burn carbon, lube oil and unburned fuel particles. Other efforts have been made to specifically address the Diesel particulate emissions problem. For example, fired burner systems have been employed to heat a combustion chamber, which receives Diesel exhaust for the purpose of burning the particulates within the chamber at very high temperatures. Such combustion chambers suffer from the drawbacks of high initial cost, safety, complexity, high-energy consumption and high maintenance cost.

Another prior art attempt is the employment of passive particle filters and configurations to trap the particulates associated with Diesel emissions. These passive particle filters are commonly made from ceramic, for example. These passive particulate filters are inadequate because when the filter fills up with carbon particles, the back pressure within the exhaust increases to such a level which necessitates that the filter be either regenerated in some fashion or replaced entirely. Since replacing the filter is not practical, many types of regeneration have been attempted, including the raising of the temperature of the filter above the combustion point of the carbon particulates in similar fashion to a self-cleaning oven. These prior art methods of filter regeneration include using a fired burner assembly using some type of fuel; raising the exhaust gas temperature by engine management, injecting fuel in the exhaust stream, or by electrical heating; Also by reducing the ignition temperature of carbon particles by adding heavy metal catalysts to the fuel and/or by coating filter material with suitable precious metal catalysts; The foregoing methods of filter regeneration have several disadvantages including low safety in the case of burners and fuel injection, unknown health effects in the case of heavy metal additives, and complexity in the case of using combination of these methods.

Further, there have been prior art attempts to employ electrically regenerable filter media instead of the passive filters that need to be replaced and fired burner systems which burn off the collected particulate matter. In the prior art, the filter media can be actively regenerated by heating the filter media indirectly which is typically done by a electrically resistive heater wire positioned proximal to the filter media to be regenerated; In this case, the filter media is made of non-conductive material such as ceramic or silicon carbide fibers. When current is passed through the heater wire, it heats up to raise the temperature of the filter media to, in turn, burn off the collected particulate matter to achieve regeneration. Heating the filter media indirectly results in long regeneration time, high energy consumption and incomplete regeneration.

As can be understood, multiple layers of filter media are commonly employed to improve the overall efficiency of the overall filter construction within a filter system. For example, the upstream filter can be more course while the downstream filter is more fine to improve the filtration efficiency and increase the dirt holding capacity. These layers can be provided in many different configurations in a given system. For example, the layers can be configured to be flat members that are stacked on top of one another. In this case, the exhaust flow, with particulate matter therein, is passed across the layers. Alternatively, the layers can be configured as cylindrical members that are concentrically positioned about one another. In this case, exhaust flow is typically direction through the inside of the inner cylindrical layer, through the layers and then out through the outer surface of the outer cylindrical layer.

In the prior art, the employment of multiple layers requires the use of multiple heater wires for proper operation of the filter system. Each of these heater wires must be routed proximal to their corresponding layer and also electrically interconnected to one another to one or more power sources requiring additional circuit design. The necessity for separate heater wires requires a much more complex construction than a passive filter construction which has no such heater wires. Further, this electrical interconnection of the heater wires adds complexity to the circuit design of the filter media construction and the assembly into which it is installed. Thus, in these prior art multiple layer assemblies, it is difficult to electrically isolate the layers for controlled independent heating. As a result, prior art multiple layer filter constructions are complex to design and more expensive to manufacture.

In view of the foregoing, there is a demand for a low energy regenerable Diesel exhaust filter construction that can be used in a system which can successfully remove carbon, lube oil and unburned fuel particulates from the exhaust of a Diesel engine. It is particularly desirable that the filter construction be multi-layer to improve the overall filtration efficiency of the filter construction without employing any additional energy resources of the engine. It is desirable that the multi-layered filter construction be directly heated without requiring separate resistive heater wires or separate power sources for each of the wires, i.e. the filter and heating element are one and the same. It is also desirable that a multi-layered filter construction have the capability of separately controlling of the amount of heat generated and the associated regeneration at the individual layers to better customize the operation and characteristics of the filter construction. It is also desirable that the regenerable filter system be compact and inexpensive to manufacture and use while being efficient in the field. It is desirable for a filter system to not impact the fuel economy of the engine or electrical system of the vehicle while still providing an efficient filter system. Further, it is desirable that the filter system is reliable over long periods of time without maintenance while improving the overall performance and particle holding capacity, even at low differential pressure.

SUMMARY OF INVENTION

The present invention preserves the advantages of prior art electrically regenerated diesel particulate filter constructions. In addition, it provides new advantages not found in currently available filter constructions, and overcomes many disadvantages of such currently available filter constructions and related systems.

The invention is generally directed to a novel and unique self-cleaning particle filter construction with particular application in removing carbon, lube oil and unburned fuel particulates from the exhaust of Diesel engines. The self-cleaning particle filter construction of the present invention enables the inexpensive assembly, use and maintenance of a compact self-cleaning particle filter constructions for use in filtration systems for Diesel engines without detracting from the overall performance of the engine or the fuel economy thereof.

The preferred embodiment of the present invention provides for a diesel particulate filter construction, for filtering particulate from a flow of exhaust, which includes a first layer of electrically resistive metal filter material in line with the flow of exhaust with particulate therein and a second layer of electrically resistive filter material which is also in line with the flow of exhaust with particulate therein.

The layers are preferably pleated cylinders concentrically positioned relative to one another. Current from a power supply is routed through the first layer and the second layer, which are electrically connected in series to one another. The layers are positioned so that exhaust flows through both the layers. Sufficient heat is generated by the flow of current through the layers to generate heat to, in turn, burn off entrapped particulate. The layers may be made of made of different materials or coated with different catalysts to generate different amounts of heat from one another to change the filtration characteristics of the particulate filter construction.

It is therefore an object of the present invention to provide an improved Diesel exhaust filter construction.

Another object of the present invention is to provide a Diesel exhaust filter construction for use in a filter system, which is electrically regenerated with a minimum amount of energy.

A further object of the present invention is to provide a Diesel exhaust filter construction that uses a single power source to save energy and simplify the electronics of the filter system into which the construction is installed.

Another objection of the present invention is to provide a Diesel exhaust filter construction that can be easily customized to where each layer of the construction provides a different level of heat and regeneration of particulate matter.

It is another object of the invention to provide an exhaust filter construction that incorporates both active and passive filtration members in the same filter construction.

It is a further object of the present invention to provide an exhaust filter construction which is reliable over long periods of time without maintenance.

It is yet a further object of the present invention to provide a Diesel exhaust filter, which has improved overall performance and increased particle-holding capacity at low differential pressure.

It is another object of the present invention to provide a Diesel exhaust filter, which efficiently removes carbon, lube oil and unburned fuel particles from the exhaust of internal combustion engines.

It is yet a further object of the present invention to provide a low cost Diesel exhaust filter with improved manufacturability.

It is another object of the present invention to provide a filter cartridge system that achieves continuous operation.

A further object of the invention is to provide a filter cartridge system that is compact.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
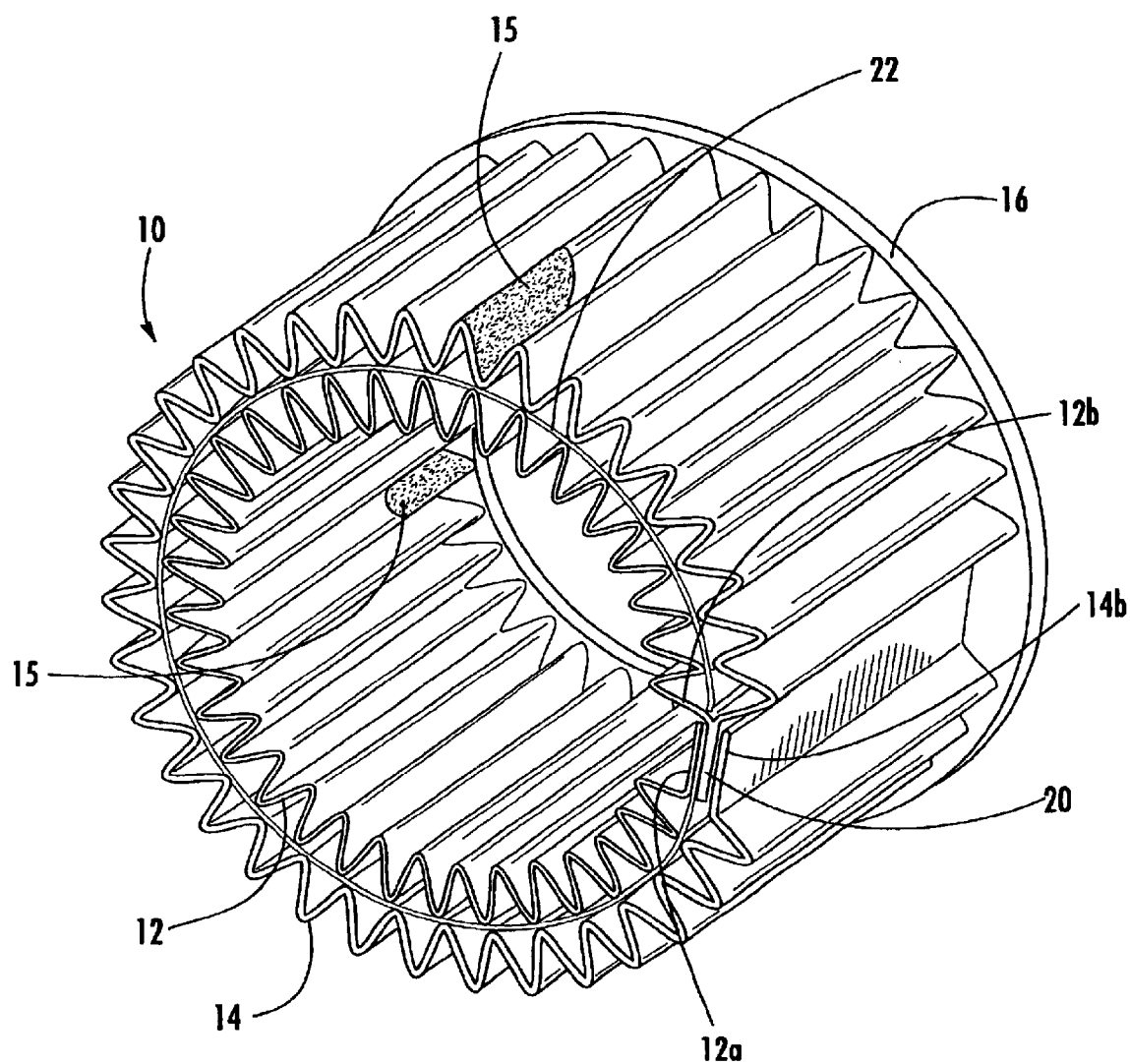
FIG. 1 is a perspective view of the filter construction in accordance with the present invention.
Figure 2:
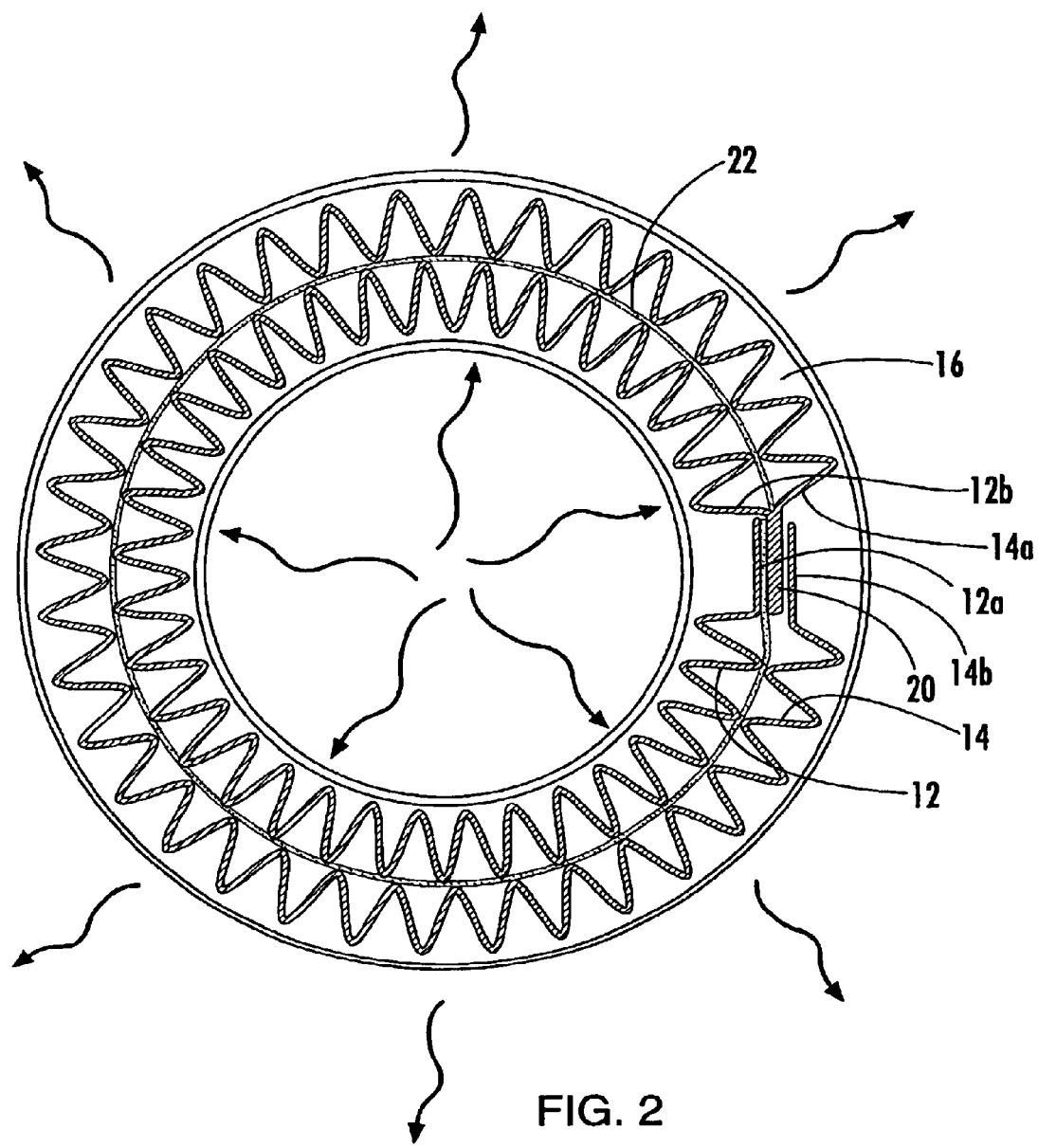
FIG. 2 is a front elevational view of the filter construction of FIG. 1.

Referring first to FIGS. 1 and 2, a multi-layer bifilar filter construction 10 of the present invention is illustrated. By way of example and for ease of discussion and illustration, the filter construction 10 is shown with two layers 12, 14 which are of a pleated configuration. It should be understood that more than two layers can be used or layers that are of configurations other than pleated. In that connection, the preferred embodiment 10 shown in FIGS. 1 and 2 will be discussed in detail to illustrate the inventive features of the present invention.

Still referring to FIGS. 1 and 2, a perspective and front elevational view is shown to include an inner layer 12 and an outer layer 14 attached to a base support plate 16. Details of the mounting of layers 12, 14 to base 16 are well known in the art and need not be described herein. The layers of are made of a material that is both electrically resistive and capable of filtering particulate matter from a diesel exhaust stream. Thus, the layers 12, 14 can directly serve as heaters to regenerate themselves of particulate matter trapped therein. For this purpose, it is preferred that the filter layers 12, 14 be made of a sintered metal fiber material 15, such as alloy of Iron, Chromium and Aluminum. While this sintered alloy 15 is preferred for the filter layers 12, 14, other suitable materials can be employed to suit the application at hand.

With this selected material, the layers 12, 14 are capable of filtering diesel particulate matter. This material enables the layers to resist oxidation, carburization and sulphidition at temperatures up to 1100 degrees Centigrade. As a result, the first layer 12 and the second layer 14 are regenerable between 30 to 120 seconds depends on the size filter and the application.

Since the layers 12, 14 also serve as electrical resistance heaters, they must be electrically interconnected to one another so that they may receive electrical current from a power source. The power source 18 is representationally shown in FIG. 4. Power sources and electrical wiring are so well known in the art that they need not be discussed herein in detail. In FIGS. 1 and 2, the inner layer 12 is electrically interconnected to the outer layer 14 at a connection point 20. More specifically, starting at the first end 12a of the first layer 12, the first, inner layer 12 extends clockwise in a substantially circular path to form a generally cylindrical configuration. The second end 12b of the first layer 12 interconnects to the first end 14a of the second layer 14 at a electrical interconnection point 20. The second outer later 14 is routed concentrically about the first inner layer 12 in a counter-clockwise fashion to terminate at a second end 14b. With this arrangement, the second substantially cylindrical layer 14 is concentrically positioned about the first substantially cylindrical layer 12. Additional layers can be provided to further enhance filtration and regeneration.

Further, a non-conductive perforated separator 22 is provided between the two layers 12, 14 to electrically isolate the two layers 12, 14 to prevent shorting thereof. While this type of non-conductive perforated separator 22 is used, other types of separators may be used in accordance with the present invention. This middle preferably non-conducting layer 22, which is heated from both sides, can also be used as a filter to improve overall filter efficiency. Such constructions are described in detail in connection with the alternative embodiment shown in FIG. 6. As a result, a double filter layer 12, 14 is provided through which diesel exhaust gases are passed for superior filtration thereof an capture of diesel particulate matter.

As seen in FIG. 2, the preferred flow of exhaust is indicated by the arrows to emanate from within the interior of the construction in a outward radiating pattern through the first layer 12 and second layer 14 of the filter construction. Of course, certain designs may require that the exhaust flow be directed in the opposite direction.

Preferably, the first layer 12 and the second layer 14 are cylindrical in configuration, as shown in FIGS. 1 and 2, to suit a given cylindrically-shaped filter system (not shown). However, these layers 12, 14 may be flat instead and stacked if, for example, the filter system is a flat, box-shaped unit. In the latter case, exhaust flow is passed across the layers 12, 14 in the desired direction to suit the application and environment at hand.

Figure 3:
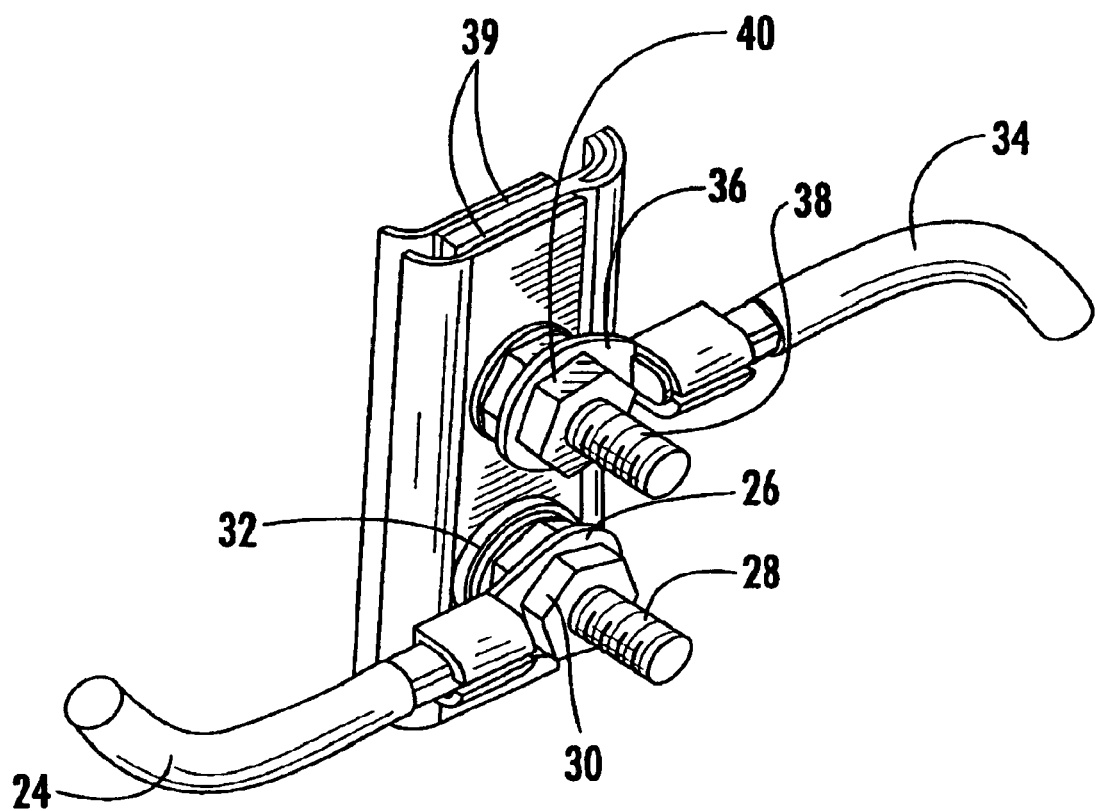
FIG. 3 is a perspective view of the electrical connector used to interface with the filter construction of FIG. 1.

As stated above, the present invention provides a unique bifilar construction 10 where two layers 12, 14 are connected to one another in series with a power source 18 so that the layers 12, 14 can directly generate heat for regeneration. Since the filter layers 12, 14 are electrically resistive for direct heating in addition to providing the filter media, interconnections must be provided to the filter layers. FIG. 3 illustrates the preferred embodiment of the electrical interconnections to the two filter media layers 12, 14. A first electrical lead 24 is connected to the first layer 12 whereby the contact plate 26 is fastened to a first post 28 by a threaded nut 30. The first post, insulated by a ceramic shoulder washer 32 passes through the second outer layer 14 into electrical communication with the first layer. A second electrical lead 34 is connected to the second outer layer 14 whereby the contact plate 36 is fastened to a second post 38 by a threaded nut 40. The posts 28, 38 also pass through the junction of the two layers 12, 14 at point 20 with McLeno separator 22 residing therebetween. Mica layers 39 are also provided for further insulation. While the interconnections of FIG. 3 are preferred, many other electrical configurations can be employed which are also part of the present invention.

Figure 4:
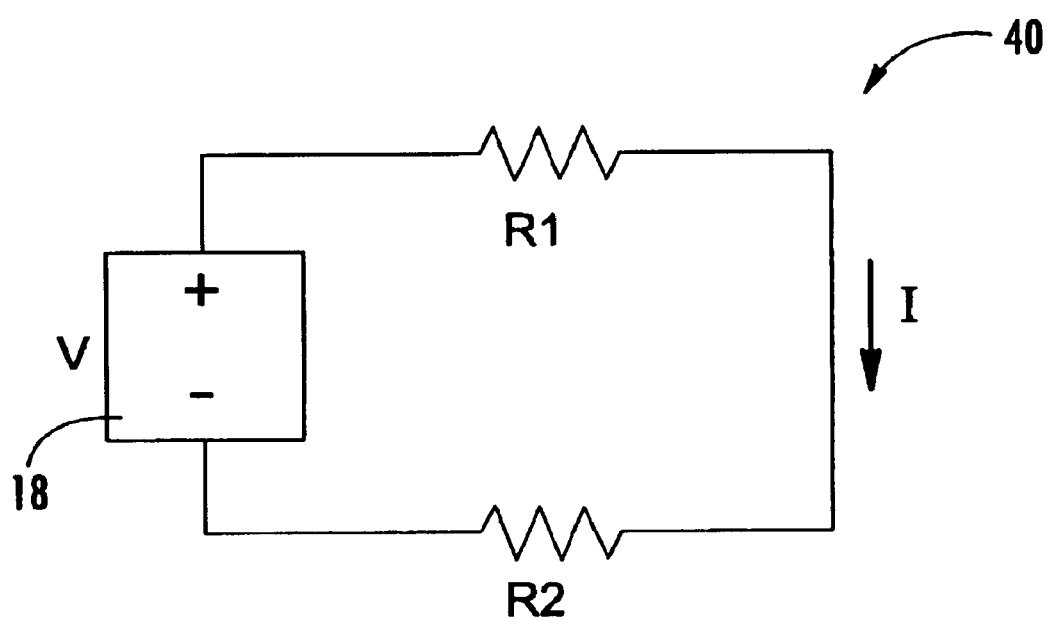
FIG. 4 is a circuit diagram representation of a two layer filter construction in accordance with the present invention.

With the interconnections of FIG. 3, the layers 12, 14 can be interconnected to one another in series to a power supply 18. FIG. 4 illustrates the general circuit diagram 40 representation of the bifilar filter construction of the present invention. A power 18 supply is provided which delivers current to the electrically resistive filter layers 12, 14. The first post 28 is preferably connected to the negative side of the power supply 18 while the second post 38 is preferably connected to the positive side of the power supply 18. While this configuration is preferred, it may be modified to suit the particular application at hand. The electrically resistive layers are represented by resistors R1 and R2 in the circuit of FIG. 4. For example, resistor R1 corresponds to the first layer 12 of filter media while resistor R2 corresponds to the second layer 14 of filter media. This circuit is governed by Ohm's law as follows:

$$V = I \times (R1 + R2)$$

In this case, V is the voltage, I is the current and R1 and R2 is the resistance in the circuit 40. The electrically resistive characteristics of the first layer 12 and the second layer 14 causes them to generate heat when current is passed through them. Moreover, the use of two resistive layers 12, 14 in series increases the resistance to reduce the amount of current at a given voltage. The amount of heat generated by an electrically resistive filter layer is generally governed as follows:

$$W = I^2 \times R$$

In this case, W is the power in watts, I is the current and R is the resistivity of the given filter layer. Thus, the amount of heat generated by the filter layers 12, 14 can be controlled by changing the amount of its resistance within the circuit 40 while maintaining the same single voltage source 18 within the series circuit environment. Thus, more than one power supply 18 is not needed. An example is provided below to illustrate the ability to control the heat delivered by each of the layers of the filter construction 10.

EXAMPLE

| Using a DC Power source of 12 volts, the following results were achieved: | Layer 1 (inside) | Layer 2 (outside) |
| --- | --- | --- |
| Material Used | Filter media A | Filter media B |
| Resistance (ohms) | 0.2 | 0.1 |
| Heat Generated (watts) | 320 | 160 |
| Temperature (degree C.) | 800 | 600 |

As can be seen from the foregoing data, it is possible to adjust the heat generated by the layers 12, 14 by modifying the characteristics of the layer. Such adjustment may be desired to control the amount of regeneration for a given layer 12, 14. For example, it may be desirable for the downstream layer to have higher heat because heat is lost across the filter construction 10. On the other hand, the upstream layer may not need as much heat for regeneration because there is less power loss closest to the source of the exhaust flow. With the present invention, the regeneration of the layers 12, 14 may be finely controlled.

In a given layer, the material itself may be modified. For example, the layers 12, 14 may use different types of metal sintered alloys 15 from one another. The thickness of the layer may be changed to alter the resistivity thereof. It is also possible to grade the sintered metal layer for the one or more of the layers to adjust the characteristics of the layer. For example, the given layer may be graded where more course fibers are upstream in the filter media while finer fibers are downstream within the filter media.

The use of catalysts on a filter layer improves filtration performance by providing extra reduction of pollution while reducing regeneration temperatures. It is possible to alter the characteristics of the layers 12, 14 by changing the catalysts thereon. For example, one layer may use a catalyst while the other one does not. Also, one layer may use one type of catalyst and the other layer use a different type of catalyst. It is also possible that the same catalyst be used on both layers but the material composition of the filter media itself be different. For example, it is preferred that platinum based catalysts be used to enhance filtration performance. Since catalysts are well known in the art, further details need not be discussed herein. Other variations may be employed by the present invention and are considered within the scope of the present invention.

In general, filter construction 10 of the present invention can be incorporated into a filter system that provides an Active Diesel Particulate Filter System (ADPFS) that is characterized by high efficiency and very low electric power consumption for regeneration. The regeneration is independent of engine exhaust temperature or fuel sulfur content. The sintered metal fibers 15 of the filter layers 12, 14 have high porosity, high soot holding capacity, low thermal mass for quick heating and low back pressure. The metal fibers 15 are designed to resist corrosion at high temperatures. This filter material is capable of capturing up to 95% of the soot in diesel exhaust.

The operation of the ADPFS is controlled by a microprocessor (not shown). Details of such microprocessor controlled are so well known in the art that they need not be discussed in detail herein. In general, the controller monitors the ADPFS and periodically, as required, an electric current is provided by the power source 18 through the filter layers 12, 14 which, as described above, then act as a heating element for regeneration of the filter layers 12, 14.

The ADPFS functions automatically, during normal engine operation. It is scalable from 15 to 1000 HP engines, and can be used in any application, stationary or mobile. In addition, for example, engines up to 2000 HP may be accommodated. The ADPFS can be combined with a Diesel oxidation catalyst to further suppress the carbon monoxide, hydrocarbons and the soluble organic fraction of the particulate matter.

Figure 5:
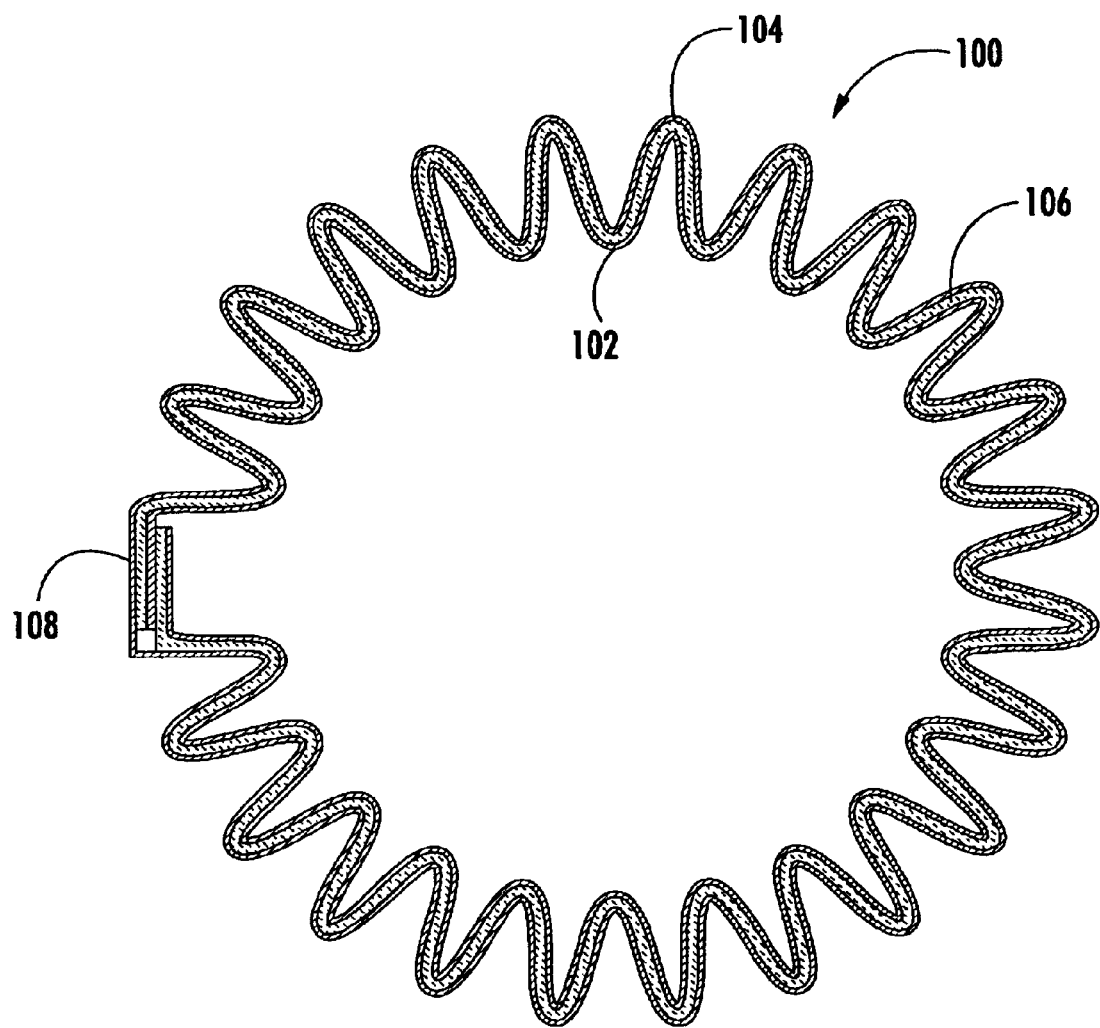
FIG. 5 is an alternative embodiment of the present invention employing an interim insulative layer.
Figure 6:
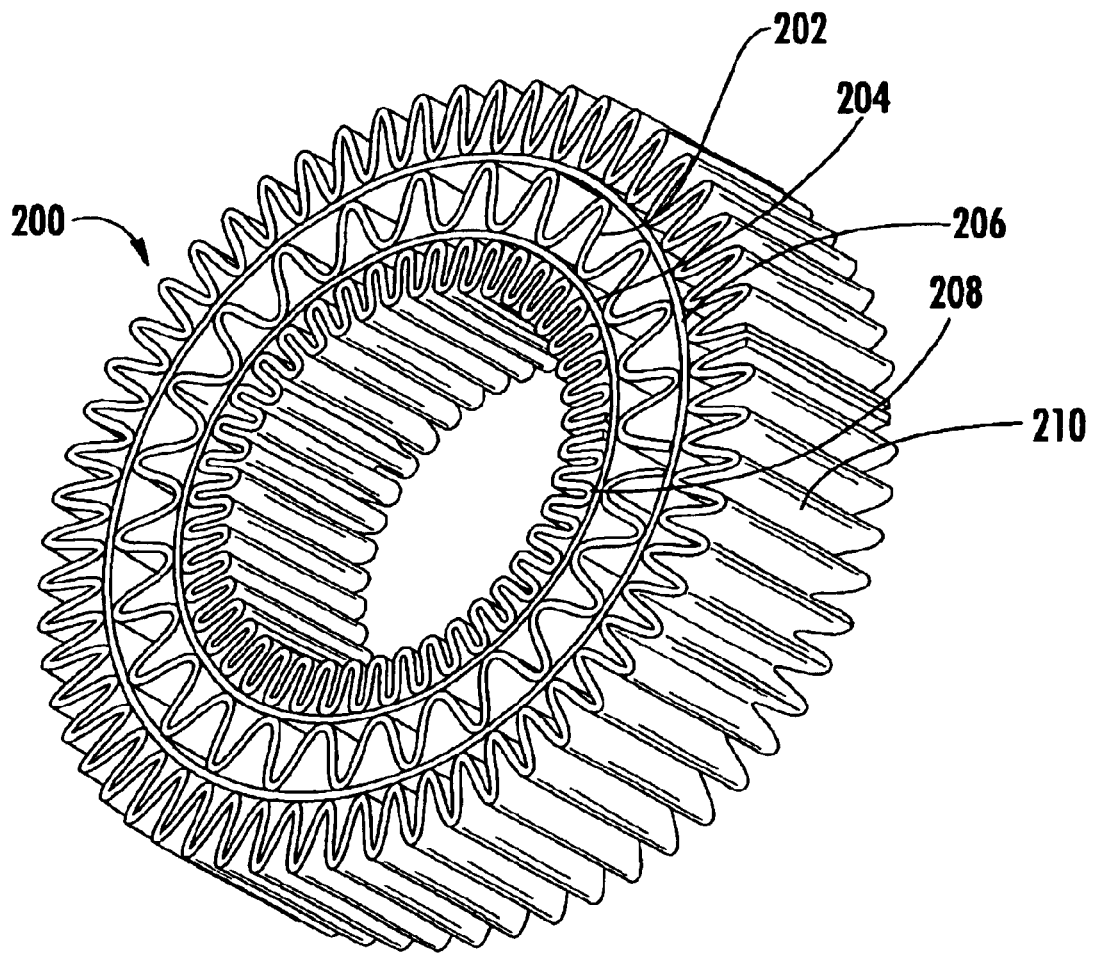
FIG. 6 is a perspective view of another alternative embodiment of the present invention employing both active and passive layers.
Figure 7:
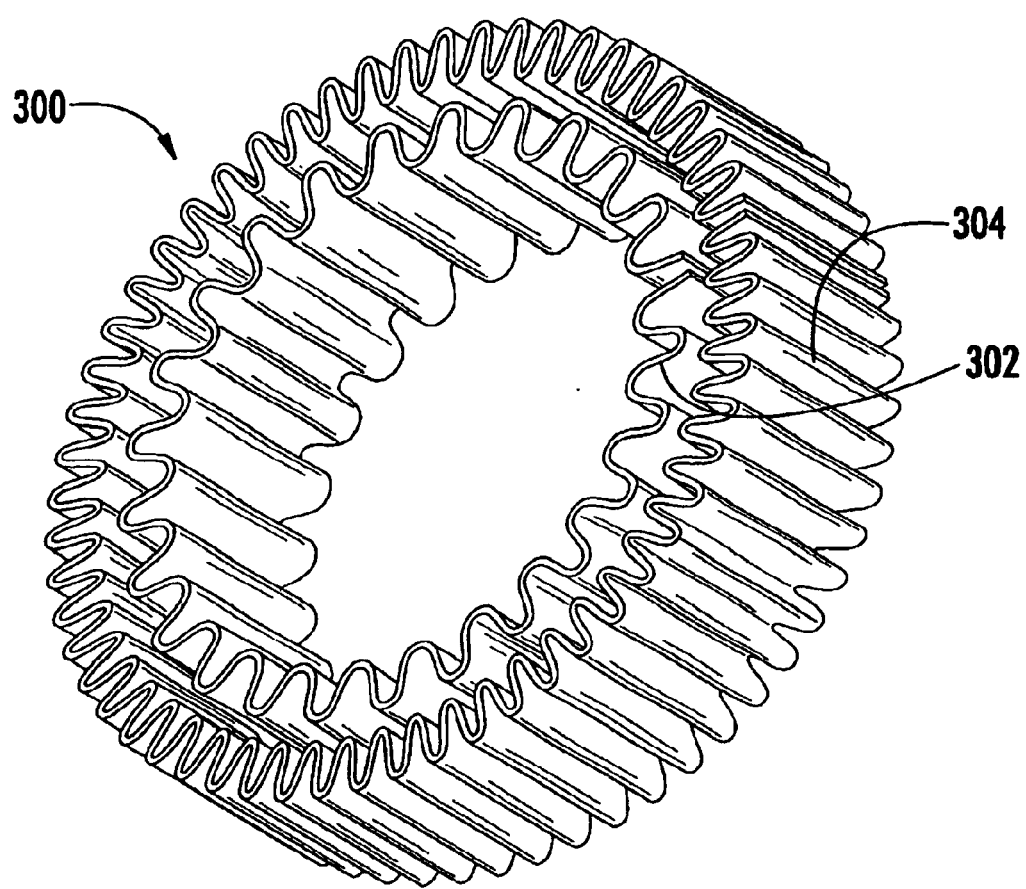
FIG. 7 is a perspective view of yet another alternative embodiment of the present invention employing only passive layers.

Turning now to FIGS. 5–7, a number of alternative embodiments are shown which incorporate the unique bifilar construction of the present invention. In FIG. 5, a multiple layer filter construction 100 is provided where a first layer 102 and a second layer 104 are pleated. The layers 102, 104 are disposed in a sandwich configuration with an insulative material 106 disposed therebetween to electrically isolate the layers 102, 104 so that they may be electrically connected in series, as described above, at connection point 108. Ceramic or silica fibers are preferably employed for the insulative material 106.

In FIG. 6, another multiple layer embodiment 200 is shown that includes a middle active layer 202 that is electrically resistive and connected to a current source. This middle layer 202 is similar in operation to the first layer 12 or the second layer 14 of FIGS. 1 and 2 of the preferred embodiment 10. In FIG. 6, the middle active layer 202 is surrounded by a number of passive layers which are not electrically resistive and do not serve a direct filter regeneration members. These passive layers are used in conjunction with the middle active layers for superior filtration of the particulate matter. More specifically, two preferably flat strips of passive filter media 204, 206 are provided on opposing sides of the middle active filter layer 202 which is preferably pleated in construction. In addition, a pleated passive layer 208 is provided on the inner side of the active layer 202 and another pleated layer 210 is provided on the outer side of the active layer 202. The active pleated layer 202 is preferably sintered metal filter fibers 15, as described above. The flat passive filters 204, 206 are preferably silica fibers while the outer pleated passive filters 208, 210 are preferably sintered metal fibers 15 coated with a platinum based catalysts.

The foregoing, multiple layer filter construction 200 illustrates that is it possible to incorporate passive filter layers 204, 206, 208, 210 with a directly active filter layer 202. As a result, the bifilar construction of FIGS. 1 and 2, with two layers 12, 14 connected in series for direct heating and regeneration, is possible in accordance with the present invention.

Still further, FIG. 7 illustrates a multiple layer filter construction 300 that employs two passive layers 302, 304 which are preferably metal sintered fibers that are coated with a catalyst. This embodiment 300 illustrates that two pleated passive layers 302, 304 may be included in a single filter construction. This two layer passive construction 300 may added to the bifilar electrically interconnected layers 12, 14 of FIGS. 1 and 2 to further enhance the overall performance of the filter construction 10.

The use of the bifilar construction 10, 100, 200, 3000 of the present invention, each of the electrically resistive metal filter strips can be electrically isolated and electrically connected in series to allow for each strip to heat up separately and independently. The layers can be designed for specific filter characteristics, such as making the strips wider or shorter as needed. The use of a bifilar filter arrangement allows for circuit design freedom where the electrical resistance of the filter layers for optimum voltage and current selection. Further, each of the layers can be made from a single layer that is either flat, pleated, or otherwise. Each layer can be a sandwich of sub-layers or graded. The layers can be of different fiber or powder sizes for maximum efficiency and optimum filling time. The foregoing filter construction can be easily incorporated into a filter cartridge or filter system in line with diesel exhaust with particulate therein.

It would be appreciated by those skilled in the art that various changes and modifications can be made to the illustrated embodiments without departing from the spirit of the present invention. All such modifications and changes are intended to be covered by the appended claims.

What is claimed is:

1. A diesel particulate filter construction for filtering particulate from a flow of exhaust, comprising:
   a first layer of electrically resistive filter material being positioned substantially transverse to the flow of exhaust with particulate therein and having a first end and a second end; the first end of the first layer providing a first terminal;
   a second layer of electrically resistive filter material being positioned substantially transverse to the flow of exhaust with particulate therein and having a first end and a second end; the first end of the second lever providing a second terminal; the second layer being electrically connected to the first layer with the second end of the first layer connected to the second end of the second layer;
   means attached to the first terminal of the first layer and the first terminal of the second layer for applying an electrical current through the first layer and the second layer in series to heat the first layer end the second layer above the combustion point of entrapped diesel particulate; the first layer and the second layer being positioned such that when an electrical current is applied through the first layer and the second layer, sufficient heat is generated to bum off entrapped particulate.

2. The diesel particulate filter construction of claim 1, wherein the first layer and the second layer are substantially in parallel with one another and in line with the exhaust flow.

3. The diesel particulate filter construction of claim 1, wherein the first layer is manufactured of a different material than the second layer.

4. The diesel particulate filter construction of claim 3, wherein the first layer has a different resistivity than the second layer.

5. The diesel particulate filter construction of claim 3, wherein the first layer generates a different amount of heat than the second layer.

6. The diesel particulate filter construction of claim 1, wherein the first layer and the second layer are pleated.

7. The diesel particulate filter construction of claim 2, further comprising: an electrically insulative layer disposed between the first layer and the second layer.

8. The diesel particulate filter construction of claim 2, wherein the first layer is cylindrical in configuration and the second layer is cylindrical in configuration; the second layer being concentrically positioned about the first layer.

9. The diesel particulate filter construction of claim 1, wherein the first layer and the second layer are made of sintered metal fibers.

10. The diesel particulate filter construction of claim 7, wherein the electrically insulative layer is made of a material selected from the group consisting of ceramic and silica.

11. The diesel particulate filter construction of claim 1, further comprising: catalyst material coated on the first layer.

12. The diesel particulate filter construction of claim 1, further comprising: catalyst material coated on the second layer.

13. The diesel particulate filter construction of claim 1, further comprising: catalyst material coated on the first layer; and catalyst material coated on the second layer.

14. The diesel particulate filter construction of claim 1, wherein the means attached to the first terminal of the first layer and the first terminal of the second layer for applying an electrical current is a power supply.

15. The diesel particulate filter construction of claim 9, wherein the electrically resistive metal filter material is a sintered alloy of Iron, Chromium and Aluminum.

16. The diesel particulate filter construction of claim 1, wherein the electrically resistive filter material resist oxidation, carburization and sulphidition at temperatures up to 1100 degrees Centigrade.

17. The diesel particulate filter construction of claim 1, wherein the first layer and the second layer are each configured to be regenerable within 30 to 120 seconds.

18. The diesel particulate filter construction of claim 1, further comprising:
   a third layer of filter material in line with the flow of exhaust with particulate therein; the third layer of filter material being a passive filter layer and not connected to the means attached to the first layer and the second layer for applying an electrical current.

* * * * *